US010338948B2

(12) United States Patent
Sundar et al.

(10) Patent No.: US 10,338,948 B2
(45) Date of Patent: Jul. 2, 2019

(54) METHOD AND DEVICE FOR MANAGING EXECUTION OF SCRIPTS BY A VIRTUAL COMPUTING UNIT

(71) Applicant: Wipro Limited, Bangalore (IN)

(72) Inventors: Krishna Sundar, Bangalore (IN); Velraja Pandian, Bangalore (IN)

(73) Assignee: Wipro Limited, Bangalore (IN)

( * ) Notice: Subject to any disclaimer, the term of this patent is extended or adjusted under 35 U.S.C. 154(b) by 242 days.

(21) Appl. No.: 15/340,402

(22) Filed: Nov. 1, 2016

(65) Prior Publication Data
US 2018/0081705 A1    Mar. 22, 2018

(30) Foreign Application Priority Data

Sep. 20, 2016   (IN) .............................. 201641032084

(51) Int. Cl.
| | |
|---|---|
| *G06F 9/54* | (2006.01) |
| *G06F 11/30* | (2006.01) |
| *G06F 11/34* | (2006.01) |
| *G06F 9/455* | (2018.01) |

(52) U.S. Cl.
CPC ............ *G06F 9/45558* (2013.01); *G06F 9/54* (2013.01); *G06F 11/301* (2013.01); *G06F 11/3051* (2013.01); *G06F 11/3495* (2013.01); *G06F 2009/45591* (2013.01)

(58) Field of Classification Search
CPC .... G06F 9/45558; G06F 9/54; G06F 11/3495; G06F 11/301; G06F 11/3051; G06F 2009/45591
See application file for complete search history.

(56) References Cited

U.S. PATENT DOCUMENTS

| | | | |
|---|---|---|---|
| 7,437,614 B2* | 10/2008 | Haswell | G06F 11/3684 714/38.13 |
| 7,707,185 B1 | 4/2010 | Czezatke et al. | |
| 8,307,358 B1 | 11/2012 | Koryakina et al. | |
| 2009/0282404 A1* | 11/2009 | Khandekar | G06F 9/45558 718/1 |

(Continued)

OTHER PUBLICATIONS

Joshi et al., Using a Host Guest Communication channel in Windows Virtual PC, Microsoft Technet, Oct. 13, 2009 (Year: 2009).*

(Continued)

*Primary Examiner* — Francisco J Aponte
*Assistant Examiner* — Kevin X Lu
(74) *Attorney, Agent, or Firm* — Finnegan, Henderson, Farabow, Garrett & Dunner, LLP

(57) ABSTRACT

The present disclosure discloses a method and a device for managing execution of scripts by a virtual computing unit configured in a host computing device. The method comprises configuring one or more ports for establishing a communication interface between the host computing device and a virtual computing unit, providing one or more scripts to be executed by the virtual computing device and one or more parameters to the virtual computing unit for execution receiving execution data from the virtual computing unit and monitoring execution of the one or more scripts based on the execution data received from the virtual computing unit. Thus, the host computing device manages execution of the one or more scripts by the virtual computing unit.

18 Claims, 5 Drawing Sheets

(56) References Cited

U.S. PATENT DOCUMENTS

| | | | |
|---|---|---|---|
| 2011/0264790 A1* | 10/2011 | Haeuptle | G06F 11/3495 |
| | | | 709/224 |
| 2013/0007522 A1 | 1/2013 | Kurapati et al. | |
| 2014/0380308 A1* | 12/2014 | Hassine | G06F 9/45558 |
| | | | 718/1 |
| 2016/0291893 A1* | 10/2016 | Chan | G06F 3/0629 |

OTHER PUBLICATIONS

Unknown Author, Add or Remove a Virtual Machine Script, technet.microsoft.com/en-us/library/cc708425(v=ws.10).aspx, Feb. 10, 2011 (Year: 2011).*

Unknown Author, Configuring VM Scripts, technet.microsoft.com/en-us/library/cc708300(v=ws.10).aspx, Oct. 27, 2004 (Year: 2004).*

Unknown Author, "Three Modes of Windows XP Mode", blogs.technet.microsoft.com/windows_vpc/2009/08/27/three-modes-of-windows-xp-mode/, Aug. 27, 2009 (Year: 2009).*

Reksunami, "How to set up a virtual machine using VMWare", https://www.ros-bot.com/guide/how-set-virtual-machine-using-vmware, 7 pages (2014).

Chris Hoffman, "How to forward ports to a virtual machine and use it as a server", www.howtogeek.com/122641/how-to-forward-ports-to-a-virtual-machine-and-use-it-as-a-serve/ , Aug. 26, 2012, pp. 1-4.

Extended European Search Report from the European Patent Office in counterpart European Application No. 16197544.6 dated Jun. 1, 2017, 8 pages.

* cited by examiner

METHOD AND DEVICE FOR MANAGING EXECUTION OF SCRIPTS BY A VIRTUAL COMPUTING UNIT

TECHNICAL FIELD

The present disclosure relates to a computer system for managing execution of scripts. More particularly, but not specifically, the present disclosure relates to a method and device for monitoring execution of scripts by a virtual machine.

BACKGROUND

In current scenario, numerous scripts are executed on computer systems. During execution of scripts, the computer system may interact with other computer systems. Also, remote monitoring of systems is required in few instances. Hence, during execution of scripts, the computer systems are completely occupied in performing one task. Therefore, the computer system cannot be used for performing alternate tasks until the ongoing execution of scripts are completed. Also, the computer system has to queue the tasks to be performed and only after execution of the ongoing tasks, further tasks can be executed.

In another scenario, execution of few tasks may be prioritized over the execution of the scripts. The execution of scripts has to be halted in order to perform these task. Hence, efficiency of the computer system may reduce.

SUMMARY

In one embodiment, the present disclosure presents a method for managing execution of scripts by a virtual computing unit, on a host computing device. The method comprises configuring, by a host computing device, one or more ports for establishing a communication interface between the host computing device and the virtual computing unit, where the virtual computing unit is configured in the host computing device. The method further comprising, providing one or more scripts to be executed by the virtual computing device and one or more parameters to the virtual computing unit and receiving execution data from the virtual computing unit and monitoring execution of the one or more scripts based on the execution data received from the virtual computing unit. Thus, the host computing device manages execution of the one or more scripts.

In one embodiment, the present disclosure provides a host computing device for managing execution of scripts by a virtual computing device, on the host computing device. The host computing device comprises a processor and a memory, communicatively coupled to the processor, comprising processor executable instructions, which, on execution causes the processor to configure one or more ports for establishing a communication interface between the host computing device and the virtual computing unit, provide one or more scripts to be executed by the virtual computing device and one or more parameters to the virtual computing unit, where the virtual computing unit executes the one or more scripts upon locating the one or more scripts from an associated memory location, receive execution data from the virtual computing unit and monitor execution of the one or more scripts based on the execution data received from the virtual computing unit. Thus, the host computing device manages execution of the one or more scripts.

In one embodiment, the present disclosure provides a non-transitory computer-readable storage medium for managing execution of scripts, when executed by a computing device, cause the computing device to configure one or more ports for establishing a communication interface between a host computing device and a virtual computing unit, provide one or more scripts to be executed by the host computing device and one or more parameters to the virtual computing unit, wherein the virtual computing unit executes the one or more scripts upon locating the one or more scripts from an associated memory location, receive execution data from the virtual computing unit, and monitor execution of the one or more scripts based on the execution data received from the virtual computing unit, thereby the host computing device managing execution of the one or more scripts.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
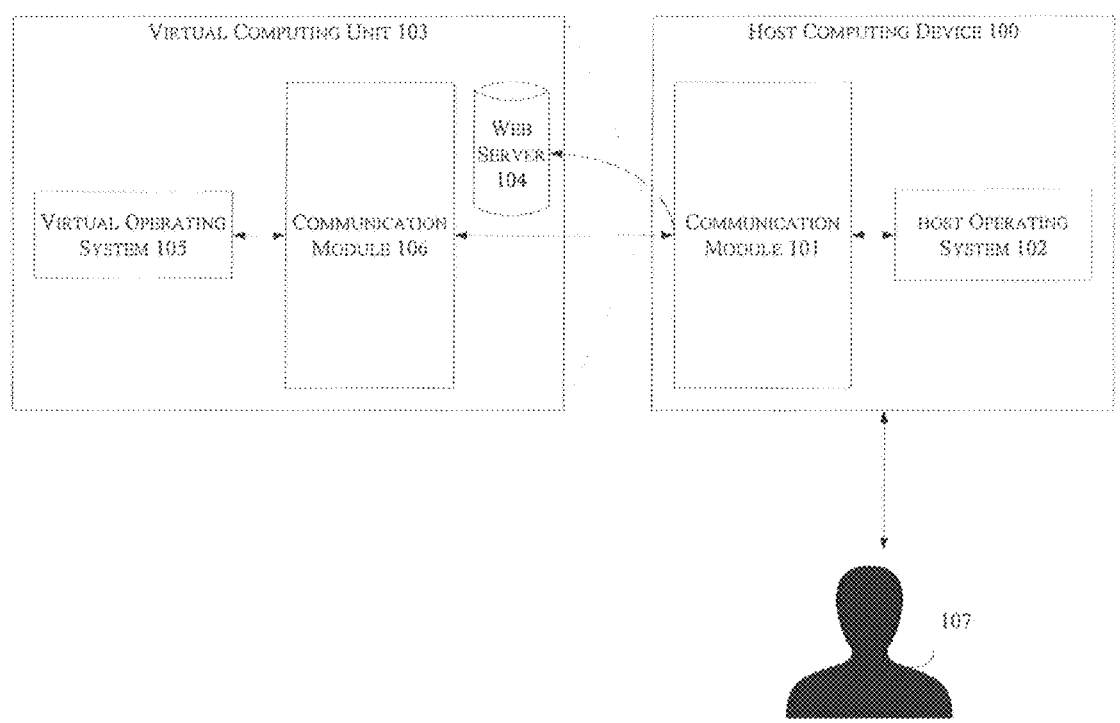
FIG. 1 shows an exemplary block diagram of a device for managing execution of scripts by a virtual computing unit in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a host computing device for managing execution of scripts by a virtual computing unit. Here, a virtual computing unit is configured in the host computing device. Then, the host computing device communicates with the virtual computing unit by establishing a communication interface. Further, the host computing device provides the virtual computing unit with one or more scripts and one or more parameters, for execution. The host computing device receives execution data from the virtual computing unit at each occurrence of an event. The host computing device monitors the execution of scripts based on the execution data received from the virtual computing unit. Thus, the host computing device can perform alternate tasks while monitoring execution of the scripts by the virtual computing unit.

FIG. 1 of the present disclosure shows an exemplary block diagram of a host computing device 100 for managing execution of scripts by a virtual computing unit 103. The host computing device 100 comprises a communication module 101 and a host operating system 102. As shown in FIG. 1, the virtual computing unit 103 is configured in the host computing device 100. The virtual computing unit 103 comprises a virtual operating system 105, a communication unit 106, and a web server 104. The host computing device 100 establishes a communication interface (not shown in the figure) to communicate with the virtual computing unit 103. The host computing device 100 provides the virtual computing unit 103 one or more scripts and associated one or more parameters for execution. Then, the host computing device 100 receives execution data from the virtual computing unit 103. Lastly, the host computing device 100 monitors the execution data. Thus, the host computing device 100 manages execution of the one or more scripts by the virtual computing unit 103.

In an embodiment, the host computing device 100 configures the virtual computing unit 103 in the host computing device 100. The host computing device 100 comprises host operating system 102. The host operating system 102 sets up a virtual box that enables to share memory of the host computing device 100 with the virtual computing unit 103. Upon allotting a predefined amount of memory, the virtual computing unit 103 is configured by installing the virtual operating system 105. Thus, a virtual computing unit 103 is set up in the host computing device 100. The network connectivity of the virtual computing unit 103 is setup in Network Address Translation (NAT) mode so that network resources available to the host computing device 100 are also available to the virtual computing unit 103. The virtual computing unit 103 is then used for execution of one or more scripts, while the host computing device 100 can perform various tasks.

In an embodiment, the host computing device 100 configures necessary tools in the virtual computing unit 103 for executing the one or more scripts. The tools may comprise the one or more scripts. In an embodiment, the one or more scripts can be user Interface (UI) based automation scripts.

In one embodiment, the web server 104 is configured in the virtual computing unit 103. The web server 104 is associated with one or more ports. The web server 104 listens to requests that are arriving at the one or more ports and serves the requests with an action. Here, the one or more ports refer to network destination of the virtual operating system 105. Each of the one or more ports are identified by 16-bit port number. Also, each of the one or more ports are associated with a virtual Internet Protocol (IP) address. Specific port numbers are used to provide specific services. Each of the one or more ports may be referred as virtual ports and has a corresponding host port.

Figure 2:
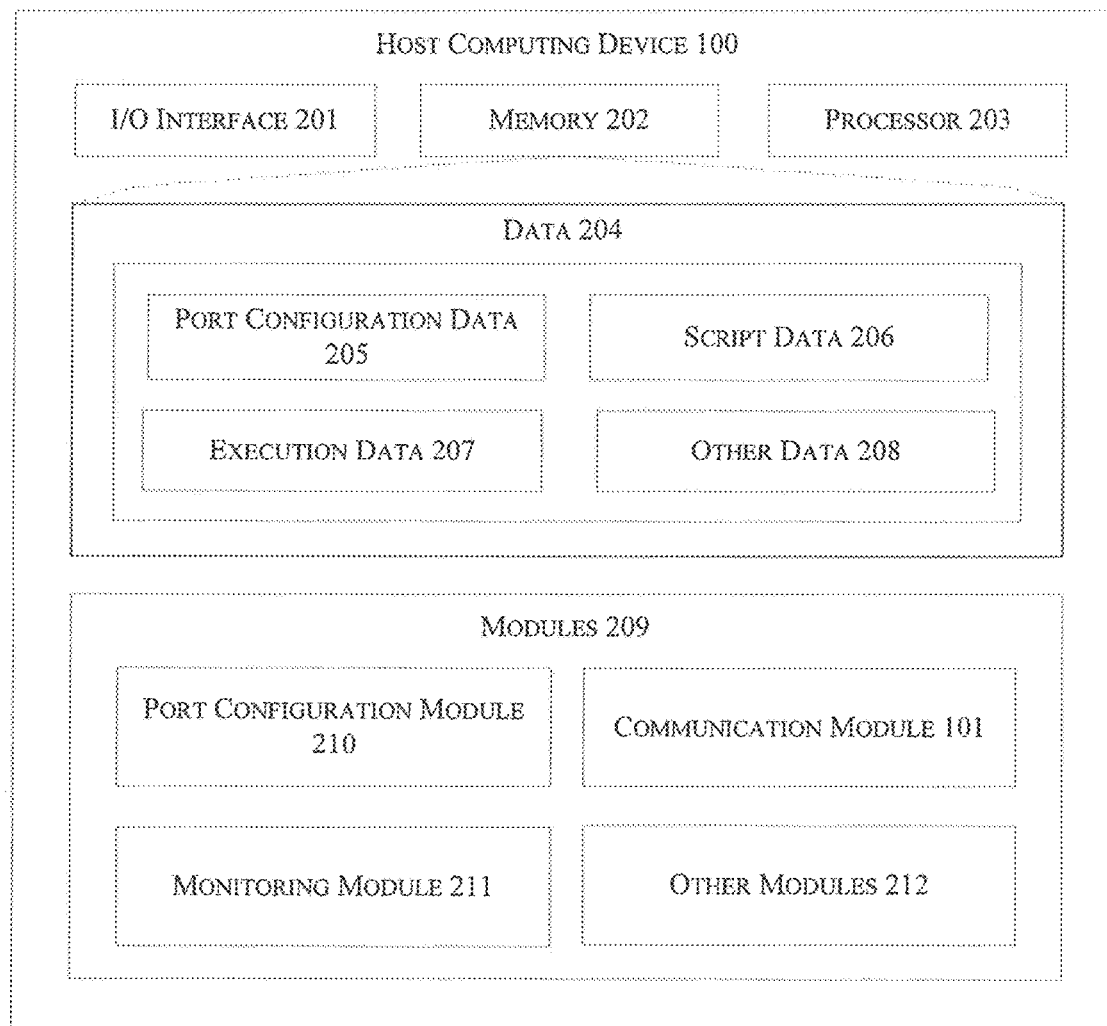
FIG. 2 shows internal architecture of a host computing device for managing execution of scripts by a virtual computing unit in accordance with some embodiments of the present disclosure.

FIG. 2 shows internal architecture of the host computing device 100. The host computing device 100 may include at least one central processing unit ("CPU" or "processor") 203 and a memory 202 storing instructions executable by the at least one processor 203. The processor 203 may comprise at least one data processor for executing program components for executing user 107 or system-generated requests. User 107 here refers to one or more users 107 as defined in the present disclosure. The memory 202 is communicatively coupled to the processor 203. The host computing device 100 further comprises an Input/Output (I/O) interface 201. The I/O interface 201 is coupled with the processor 203 through which an input signal or/and an output signal is communicated.

In an embodiment, one or more data 204 may be stored within the memory 202. The one or more data 204 may include, for example, port configuration data 205, script data 206, execution data 207 and other data 208. The port configuration data 205 includes parameters related to the one or more ports of the host computing device 100, Internet Protocol (IP) address associated with the one or more ports of the host computing device 100, one or more ports of the virtual computing unit 103 corresponding to the one or more ports of the host computing device 100, etc. The script data may include one or more scripts to be executed, type of scripts, one or more parameters associated with the one or more scripts, etc.

In an embodiment, the execution data includes number of scripts successfully executed, number of unsuccessful execution, number of exceptions, type of exceptions, number of errors, type of errors, etc. In an embodiment, the host computing device 100 is associated with a database (not shown in figure). The host computing device 100 stores the execution data in the database. In an embodiment, the host computing device 100 receives the execution data at each occurrence of an event. Here, the event may be an at least one of an exception, error or successful execution of the one or more scripts.

The other data 208 may be used to store data, including temporary data and temporary files, generated by modules 209 for performing various functions of the host computing device 100.

In an embodiment, the one or more data 204 in the memory 202 is processed by modules 209 of the host computing device 100. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 209 when configured with the functionality defined in the present disclosure will result in a novel hardware.

In one implementation, the modules 209 may include, for example, port configuration module 210, communication module 101, monitoring module 211 and other modules 212. It will be appreciated that such aforementioned modules 209 may be represented as a single module or a combination of different modules.

In an embodiment, the port configuration module 210 configures the one or more ports of the host computing device 100 for communicating with the virtual computing unit 103. Here, the one or more ports refer to network destination of the host operating system 102. Each of the one or more ports are identified by 16-bit port number. Also, each of the one or more ports are associated with a virtual Internet Protocol (IP) address. Specific port numbers are used to provide specific services. For example, port number 21 refers to File Transfer Protocol (FTP), port number 53 refers to Domain Name System (DNS) service, port number 80 refers to Hypertext Transfer Protocol (HTTP) used in the World Wide Web (WWW). Each port of the one or more ports of the host computing device 100 are mapped to a corresponding port of the virtual computing unit 103. Thus, a communication interface is established though port forwarding. The host computing device 100 can communicate with the virtual computing unit 103 through the communication interface. The port configuration module 210 also determines communication protocols to be used for communication between the host computing device 100 and the virtual computing unit 103. Table 1 shows port number of the host computing device 100 and corresponding port of the virtual computing unit 103.

TABLE 1

| PROTOCOL | HOST PORT | VIRTUAL IP ADDRESS | VIRTUAL PORT |
| --- | --- | --- | --- |
| TCP | 61999 | 10.0.2.15 | 80 |
| TCP | 50064 | 10.0.2.15 | 60064 |

From Table 1, the host port 61999 has a corresponding virtual port 80. Also, the virtual port 80 is assigned a virtual IP address. Further, the communication between the host computing device 100 and the virtual computing unit 103 over the host port 61999 is carried out through Transmission Control Protocol (TCP). The mapping as shown in the above table indicates that, when http://localhost:61999 is accessed, the request is forwarded to the corresponding virtual port 80. Thus, services associated with the virtual port 80 are rendered by the virtual computing unit 103. Similarly, host port 50064 has a corresponding virtual port 60064 and an IP address of 10.0.2.15. The protocol specified for communication over the host port 50064 is Transmission Control Protocol (TCP). Since, the host computing device 100 makes a http request, the web server 104 listens to the requests made on the ports. As shown in the Table 1, the web server 104 listens to the port 80 and port 60064. When the host computing device 100 makes a request on the ports, the web server 104 responds to the request with an appropriate action.

In an embodiment, the communication module 101 requests the virtual computing unit 103 to provide list of the one or more scripts available. Further, the communication module 101 receives the list of the one or more scripts from the virtual computing unit 103. The communication module 101 then communicates the one or more scripts to be executed by the host computing device 100 along with one or more associated parameters to the virtual computing unit 103 for execution. Furthermore, the communication module 101 receives execution data from the virtual computing unit 103 post execution of the one or more scripts. Here, the execution data is received at every occurrence of the event.

In an embodiment, the one or more scripts to be executed by the virtual computing device 104 and the one or more parameters are input by a user 107 associated with the host computing device 100. The one or more parameters may include username, password, error correction data, exception handling data, values related to execution of the one or more scripts, script domain name, script name, etc.

In an embodiment, the monitoring module 211 monitors the execution of the one or more scripts based on the execution data received from the virtual computing unit 103, thus the host computing device 100 manages execution of the one or more scripts. Here, the monitoring module 211 captures real time status of the execution of the one or more scripts. The execution data comprises success or warning messages and outcome of the execution of the one or more scripts. The execution data further comprises exceptions and error messages occurred during execution of the one or more scripts. Such messages are immediately received from the virtual computing unit 103 and is displayed to the user 107.

In an embodiment, the exception message may be requirement of username and password. Likewise, error massage may be unavailability of network resources to access Internet.

In an embodiment, the other modules 212 may include display module, notification module, etc.

Figure 3:
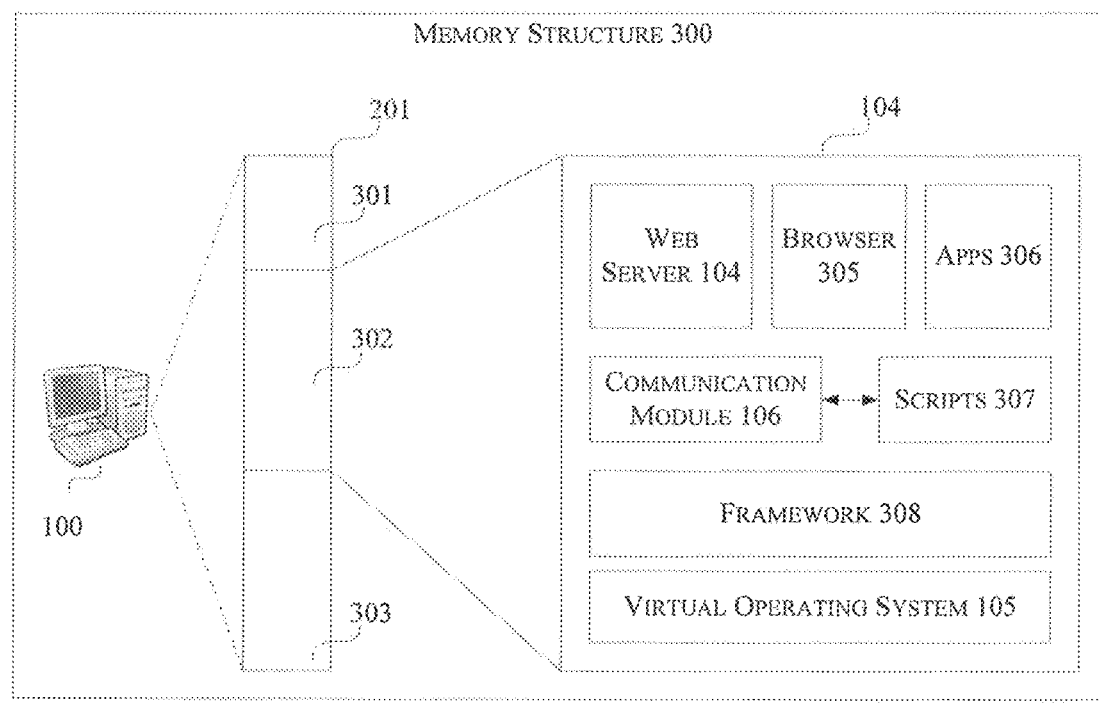
FIG. 3 shows a memory structure of a host computing device illustrating sharing memory between a host computing device and a virtual computing unit in accordance with some embodiments of the present disclosure.

FIG. 3 shows a memory structure 300 of the host computing device 100 illustrating sharing of memory between a host computing device 100 and a virtual computing unit 103 in accordance with some embodiments of the present disclosure. As shown, the memory of the host computing device 100 is shared with the virtual computing unit 103. During configuration, a predefined memory segment is allotted for virtual computing unit 103. For example, in a Random Access Memory (RAM) of 8 Giga Bytes (GB), 4 GB can be allotted to the host computing device 100 and 3 GB can be allotted to the virtual computing unit 103. The remaining 1 GB can be free memory segment. From FIG. 3, 303 refers to the memory segment allotted to the host computing device 100, 302 refers to the memory segment allotted to the virtual computing unit 103 and 301 refers to the free memory segment.

Figure 4:
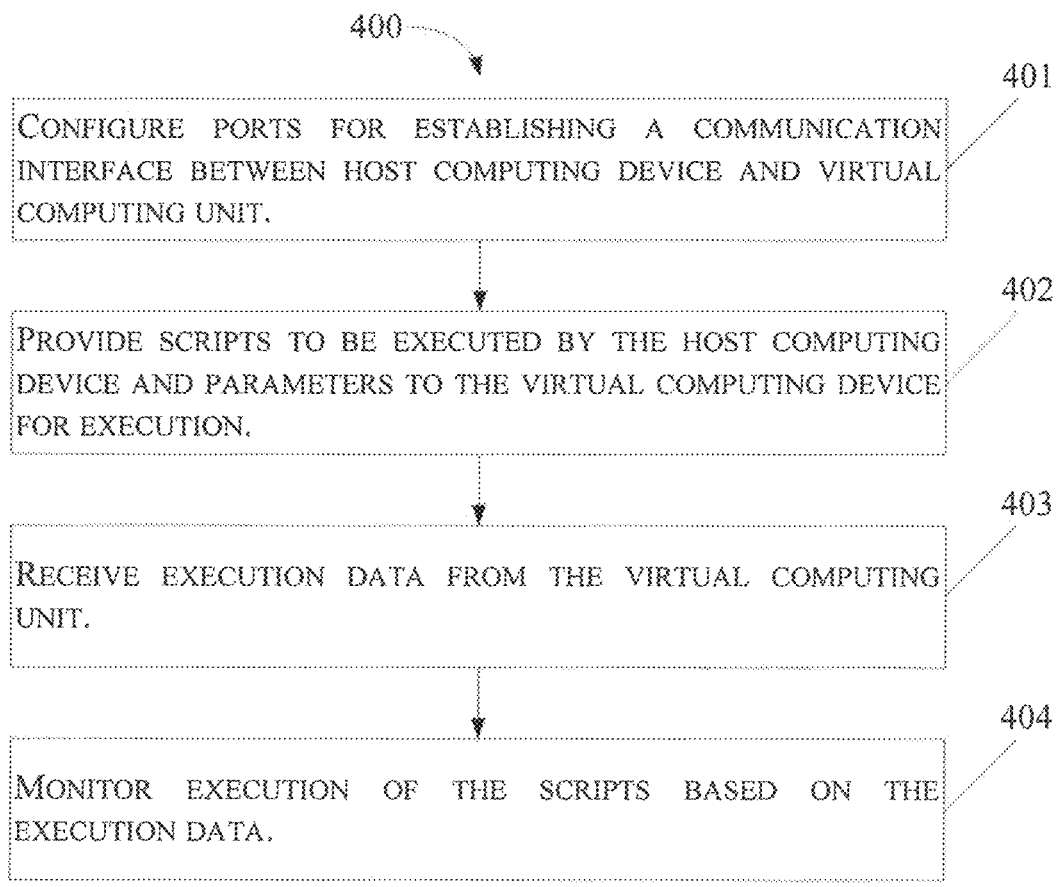
FIG. 4 shows a flow chart of method steps for managing execution of scripts by a virtual computing unit, on a host computing device.

FIG. 4 shows a flow chart illustrating a method for monitoring execution of scripts by the virtual computing unit 103 configured in the host computing device 100.

As illustrated in FIG. 4, the method 400 may comprise one or more steps for managing execution of scripts by the virtual computing unit 103 configured in the host computing device 100. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, the port configuration module 210 configures the one or more ports of the host computing device 100 for establishing communication with the virtual computing unit 103. Here, the port configuration module 210 maps one or more ports of the host computing device 100 with one or more ports of the virtual computing unit 103. Thus, a communication interface is established between the host computing device 100 and the virtual computing unit 103 through the communication interface. Referring back to Table 1, each of the one or more ports of the virtual computing unit 103 is provided an IP address. The IP address indicates the port through which the virtual computing unit 103 communicates. Hence, the host computing device 100 can communicate back to the same port through which the virtual computing unit 103 communicates. Thus, the port configuration module 210 helps in establishing communication between the host computing device 100 and the virtual computing unit 103.

At step 402, the communication module 101 provides the one or more scripts and associated one or more parameters to the virtual computing unit 103 for execution. Upon configuring the virtual computing unit 103, the communication module 101 requests the virtual computing unit 103 for the list of one or more scripts. Further, the communication module 101 receives the list of the one or more scripts from the virtual communication module 101. Here, the virtual computing unit 103 identifies the list of the one or more scripts from the memory location 302 allocated to the virtual computing unit 103. Then, the communication module 101 provides the list of the one or more scripts to the user 107 through a Graphical User Interface (GUI). The user 107 selects at least one script among the list of the one or more scripts, for execution. The selection of the at least one script is received by the communication module 101 as an input. The communication module 101 provides the at least one script to the virtual computing unit 103 for execution. Also, the communication module 101 provides the one or more parameters associated with the at least one script to the virtual computing unit 103, which enables the virtual computing unit 103 to execute the at least one script. In an embodiment, the one or more parameters are provided by the user 107. Alternatively, the host computing device 100 can generate the one or more parameters based on historical analysis of the one or more parameters provided by the user 107.

At step 403, the communication module 101 receives execution data from the virtual computing unit 103. In an embodiment, the execution data includes number of scripts successfully executed, number of unsuccessful execution, number of exceptions, type of exceptions, number of errors, type of errors, etc. In an embodiment, the host computing device 100 is associated with a database (not shown in figure). The host computing device 100 stores the execution data in the database. In an embodiment, the host computing device 100 receives the execution data at each occurrence of an event. Here, the event may be an at least one of an exception, error or successful execution of the one or more scripts.

At step 404, the monitoring module 211 monitors execution of the at least one script based on the execution data. Here, the monitoring module 211 examines the execution status of the at least one script. Post examination, the monitoring module 211 stores results of the examination in the database associated with the host computing device 100. Further, the monitoring module 211 prompts the user 107 when an exception or an error message is received from the virtual computing unit 103. Here, an exception may be requirement of a username, password, the one or more parameters, etc. An error may be unavailability of resources, network issues, system crash, null pointer, domain errors, etc. The monitoring module 211 may further instruct the virtual computing unit 103 to complete execution of the at least one script upon handling each of the exceptions and errors.

In an embodiment, the at least one script is pipelined by the host computing device 100. Here, the host computing device 100 provides the at least one script to the virtual computing unit 103 for execution based on execution status of the ongoing script. The host computing device 100 pipelines each of the at least one script. Then, the host computing device 100 provides the at least one script at an instance based on priority, availability of data for executing the at least one script, severity, etc. Thereby, the virtual computing unit 103 executes the at least one script.

In an embodiment, the host computing device 100 interacts with the user 107 through the I/O interface 201. In an embodiment, the GUI may be provided to the user 107 for providing inputs and the one or more parameters. The one or more parameters are based on the at least one script provided to the virtual computing unit 103 for execution.

In an embodiment, the host computing device 100 may prompt the user 107 by means of a notification unit associated with the host computing device 100. Alternatively, the host computing device 100 can prompt the user 107 by means of the GUI.

Consider an example, where the host computing device 100 has an operating system "ABC". The host computing device 100 configures a virtual computing unit 103 in the host computing device 100. Let the operating system installed in the virtual computing unit 103 be "XYZ". Further, the host computing device 100 configures necessary tools in the virtual computing unit 103, required for execution of scripts. The tools may comprise the one or more scripts. Now, the host computing device 100 requests a list of the one or more scripts from the virtual computing unit 103 and receives the list of the one or more scripts. Let the list comprise 100 scripts. The host computing device 100 displays the list of 100 scripts to the user 107. Then, the host computing device 100 receives inputs from the user 107 regarding which script among the 100 scripts should be executed. Also, the host computing device 100 receives the one or more parameters associated with the scripts from the user 107. For instance, let the user 107 choose 10 scripts among the 100 scripts for execution. Also, let the user 107 provide username and password as parameters required for successful execution of the 10 scripts. Further, the host computing device 100 provides the 10 scripts and the username and the password to the virtual computing unit 103 for execution. Then, the host computing device 100 receives execution data from the virtual computing unit 103. The execution data comprises information regarding successful execution of the scripts, exceptions occurred during execution of the 10 scripts, errors occurred during execution of the 10 scripts, etc. Let 8 scripts among the 10 scripts be successfully executed, let an exception occur during execution of the $9^{th}$ script and let an error occur during execution of the $10^{th}$ script. The host computing device 100 monitors execution of the 10 scripts based on the execution data received from the virtual computing unit 103. Then, the host computing device 100 prompts the user 107 immediately with the exception and the error caused during execution of the $8^{th}$ and $9^{th}$ script respectively. Parallelly, the host computing device 100 stores the monitored information regarding successfully executed scripts in the database. Also, the monitored information may be displayed to the user 107 at predefined intervals of time.

COMPUTER SYSTEM

Figure 5:
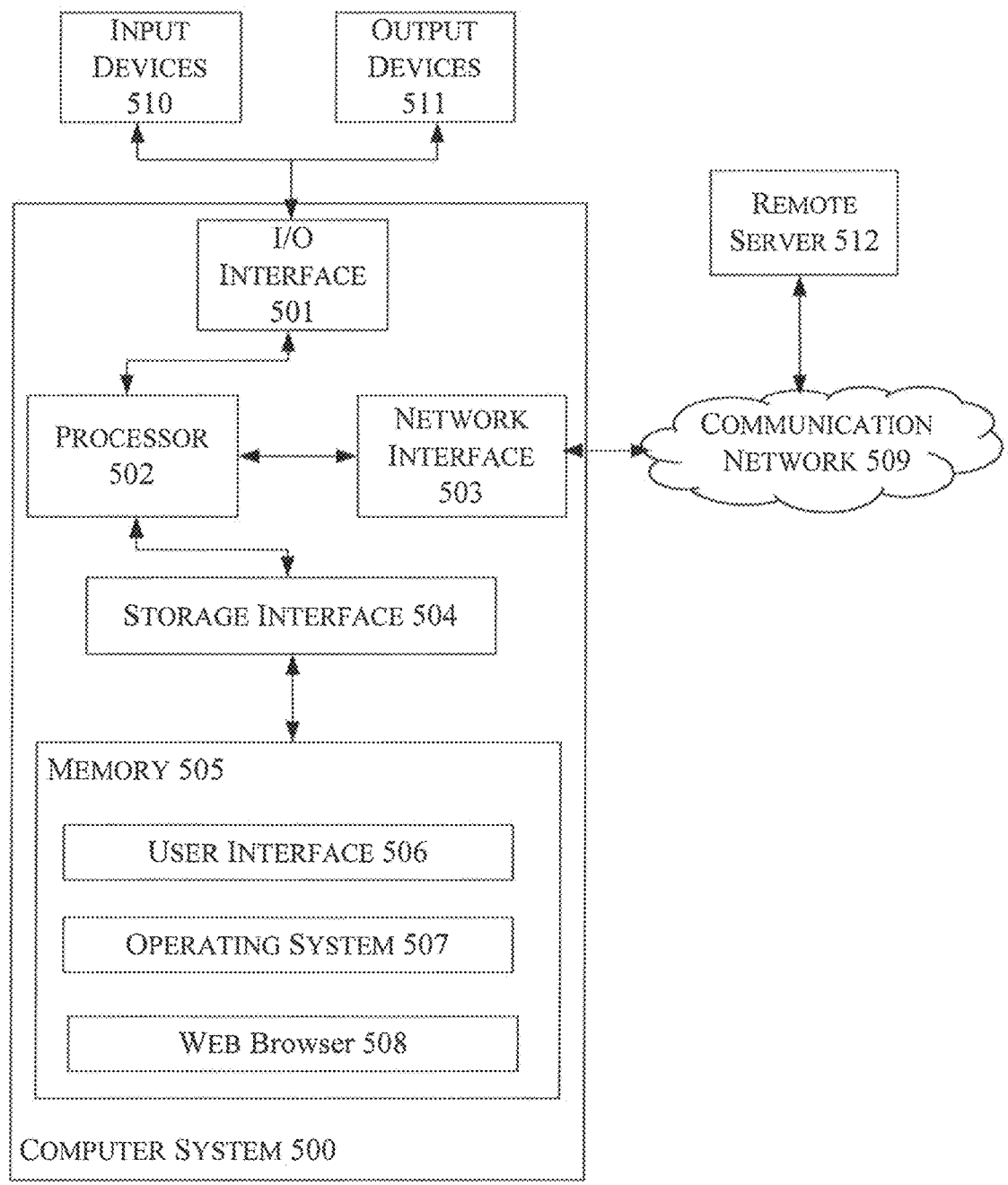
FIG. 5 shows a general purpose computer system for managing execution of scripts by a virtual computing unit, on a host computing device.

FIG. 5 illustrates a block diagram of an exemplary computer system 500 for implementing embodiments consistent with the present disclosure. In an embodiment, the computer system 500 is used to implement the method for monitoring execution of scripts by a virtual computing unit 103 on a host computing device 100. The computer system 500 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 503 and the communication network 509, the computer system 500 may communicate with the one or more service operators.

In some embodiments, the processor 502 may be disposed in communication with a memory 505 (e.g., RAM, ROM, etc. not shown in FIG. 7) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

In one embodiment, the host computer system 500 may provide the web server 104 services to the virtual computing unit 103 to communicate with remote servers 512.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a method for monitoring execution of scripts by a virtual computing unit configured in a host computing device. During monitoring, the host computing device can perform alternate tasks. Thus, productivity of usage of the host computing device increases.

In an embodiment, the present disclosure presents a method where a user associated with the host computing device can utilise the host computing device while the scripts are being executed by the virtual computing unit. Thus, user's performance increases due to continuous usage of the host computing device.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 100 | Host computing device |
| 101 | Host communication module |
| 102 | Host operating system |
| 103 | Virtual computing unit |
| 104 | Web server |
| 105 | Virtual operating system |
| 106 | Virtual communication module |
| 201 | I/O interface |
| 202 | Memory |
| 203 | Processor |
| 204 | Data |
| 205 | Port configuration data |
| 206 | Script data |
| 207 | Execution data |
| 208 | Other data |
| 209 | Modules |
| 210 | Port configuration module |
| 211 | Monitoring module |
| 212 | Other modules |
| 300 | Memory structure of host computing device |
| 301 | Unused memory segment |
| 302 | Memory segment used by virtual computing unit |
| 303 | Memory segment used by host computing device |
| 500 | Computer system |
| 501 | I/O Interface |
| 502 | Processor |
| 503 | Network interface |
| 504 | Storage interface |
| 505 | Memory |
| 506 | User Interface |
| 507 | Operating system |
| 508 | Web browser |
| 509 | Communication network |
| 510 | Input devices |
| 511 | Output devices |
| 512 | Remote server |

What is claimed is:

1. A method for managing execution of scripts by a virtual computing unit, on a host computing device, comprising:
configuring, by a host computing device, one or more ports for establishing a communication interface between the host computing device and a virtual computing unit, wherein the virtual computing unit is configured in the host computing device;
providing, by the host computing device, one or more scripts to be executed by the virtual computing unit and one or more parameters associated with the one or more scripts to the virtual computing unit via the communication interface, wherein the virtual computing unit executes the one or more scripts upon locating the one or more scripts from an associated memory location;
receiving, by the host computing device, during the execution of the one or more scripts, real time status of the execution of the one or more scripts from the virtual computing unit via the communication interface, wherein the real time status comprises information of successfully executed scripts, information of unsuccessfully executed scripts, a number of exceptions, type of exceptions, a number of errors, and type of errors; and
instructing, by the host computing device, the virtual computing unit to complete execution of unsuccessfully executed scripts upon handling each of the exceptions and errors, wherein the exceptions and the errors are handled based on the one or more parameters, and wherein the exceptions and the errors are handled based on at least one of priority, availability of data and severity associated with each of the scripts.

2. The method of claim 1, wherein the virtual computing unit comprises a virtual operating system.

3. The method of claim 1, wherein the host computing device receives a list of the one or more scripts from the virtual computing unit, wherein at least one script is selected for execution.

4. The method of claim 1, wherein the one or more scripts are pipelined by the host computing device.

5. The method of claim 1, wherein the one or more parameters are provided based on a list of the one or more scripts and wherein the one or more parameters comprises username, password, error correction data, exception handling data, values related to execution of the one or more scripts, script domain name, script name.

6. The method of claim 1, wherein the host computing device receives the real time status of the execution of the one or more scripts upon occurrence of one or more events.

7. A host computing device for managing execution of scripts by a virtual computing unit configured in the host computing device, the host computing device comprising:
a processor; and
a memory, communicatively coupled with the processor, comprising processor executable instructions, which, on execution, causes the processor to:
configure one or more ports for establishing a communication interface between a host computing device and a virtual computing unit;
provide one or more scripts to be executed by the host computing device and one or more parameters associated with the one or more scripts to the virtual computing unit via the communication interface, wherein the virtual computing unit executes the one or more scripts upon locating the one or more scripts from an associated memory location;
receive, during the execution of the one or more scripts, real time status of the execution of the one or more scripts from the virtual computing unit via the communication interface, wherein the real time status comprises information of successfully executed scripts, information of unsuccessfully executed scripts, a number of exceptions, type of exceptions, a number of errors, and type of errors; and
instruct the virtual computing unit to complete execution of unsuccessfully executed scripts upon handling each of the exceptions and errors, wherein the exceptions and the errors are handled based on the one or more parameters, and wherein the exceptions and the errors are handled based on at least one of priority, availability of data and severity associated with each of the scripts.

8. The host computing device of claim 7, wherein the virtual computing unit comprises a virtual operating system.

9. The host computing device of claim 7, wherein the host computing device receives a list of the one or more scripts from the virtual computing unit, wherein at least one script is selected for execution.

10. The host computing device of claim 7, wherein the one or more scripts are pipelined by the host computing device.

11. The host computing device of claim 7, wherein the one or more parameters are provided based on a list of the one or more scripts and wherein the one or more parameters comprises username, password, error correction data, exception handling data, values related to execution of the one or more scripts, script domain name, script name.

12. The host computing device of claim 7, wherein the host computing device receives the real time status of the execution of the one or more scripts upon occurrence of one or more events.

13. A non-transitory computer-readable storage medium for managing execution of scripts, when executed by a computing device, cause the computing device to:
configure one or more ports for establishing a communication interface between a host computing device and a virtual computing unit;
provide one or more scripts to be executed by the host computing device and one or more parameters associated with the one or more scripts to the virtual computing unit via the communication interface, wherein the virtual computing unit executes the one or more scripts upon locating the one or more scripts from an associated memory location;
receive, during the execution of the one or more scripts, real time status of the execution of the one or more scripts from the virtual computing unit via the communication interface, wherein the real time status comprises information of successfully executed scripts, information of unsuccessfully executed scripts, a number of exceptions, type of exceptions, a number of errors, and type of errors; and
instruct the virtual computing unit to complete execution of unsuccessfully executed scripts upon handling each of the exceptions and errors, wherein the exceptions and the errors are handled based on the one or more parameters, and wherein the exceptions and the errors are handled based on at least one of priority, availability of data and severity associated with each of the scripts.

14. The non-transitory computer-readable storage medium of claim 13, wherein the virtual computing unit comprises a virtual operating system.

15. The non-transitory computer-readable storage medium of claim 13, wherein the host computing device receives a list of the one or more scripts from the virtual computing unit, wherein at least one script is selected for execution.

16. The non-transitory computer-readable storage medium of claim 13, wherein the one or more scripts are pipelined by the host computing device.

17. The non-transitory computer-readable storage medium of claim 13, wherein the one or more parameters are provided based on a list of the one or more scripts and wherein the one or more parameters comprises username, password, error correction data, exception handling data, values related to execution of the one or more scripts, script domain name, script name.

18. The non-transitory computer-readable storage medium of claim 13, wherein the host computing device receives the real time status of the execution of the one or more scripts upon occurrence of one or more events.

* * * * *